Figure 1:
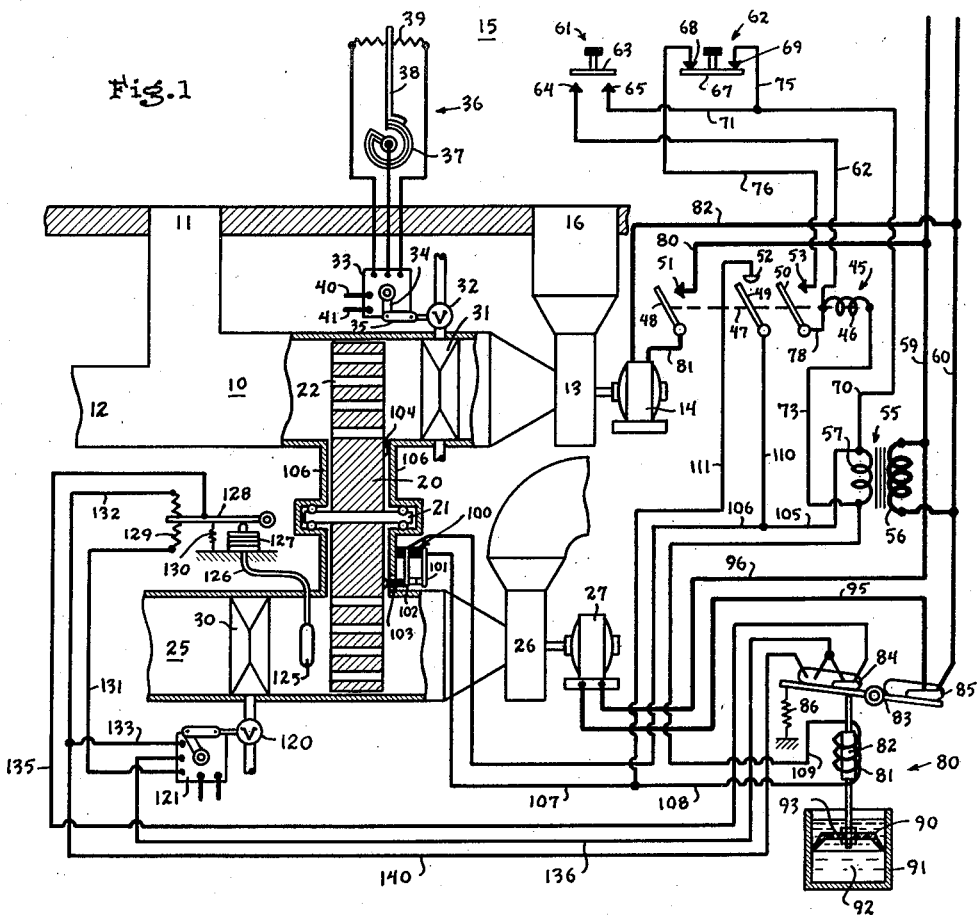

Oct. 29, 1940.  J. S. LOCKE  2,219,547

AIR CONDITIONING SYSTEM

Filed June 7, 1939

Inventor
James S. Locke
By George H Fisher
Attorney

Patented Oct. 29, 1940

2,219,547

UNITED STATES PATENT OFFICE 2,219,547

AIR CONDITIONING SYSTEM

James S. Locke, Chicago, Ill., assignor to Minneapolis-Honeywell Regulator Company, Minneapolis, Minn., a corporation of Delaware Application June 7, 1939, Serial No. 277,821

16 Claims. (Cl. 183—4)

This invention relates to an air conditioning system and more particularly to a system for removing moisture from the air in a space.

This invention relates particularly to a dehumidifying system utilizing a dehumidifying arrangement of the type illustrated in the Kopp Patent 2,115,226 issued on April 26, 1938, and relates particularly to a control arrangement for controlling the activating means or the means for removing moisture from the dehumidifying wheel as shown in that patent.

It is therefore an object of the present invention to provide a control system for controlling the reactivation of a dehumidifying wheel which may be used in an air conditioning system for dehumidification purposes.

Other objects and advantages will become apparent upon a study of the specification, claims and appended drawing wherein like reference characters represent like parts in the various views and wherein—

Figure 3:
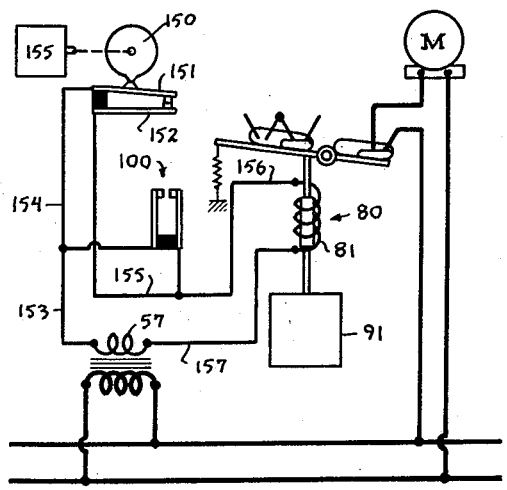
Figure 2:
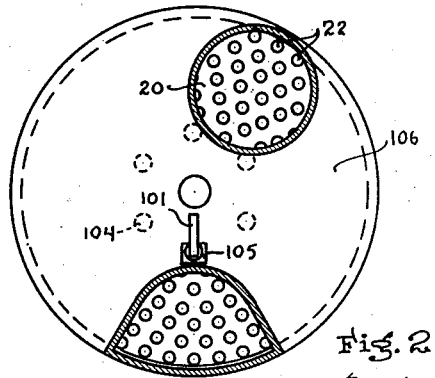

Figure 1 is a diagrammatic view showing one form of control system embodying my invention, Figure 2 is a sectional view taken through the chambers 10 and 25 of Figure 1, Figure 3 is a modification of a portion of the control system illustrated in Figure 1.

Referring more particularly to Figure 1, an air conditioning chamber is represented by the reference character 10 and air is drawn into this chamber through the return air inlet 11 and a fresh air inlet 12 by a fan 13 driven by a motor 14, the air being delivered into the space 15 which is being conditioned by way of the discharge duct 16.

A dehumidifying wheel 20 is rotatably mounted, by means of a shaft 21, about a horizontal axis, the outer portion of this wheel extending into the air conditioning chamber 10 as illustrated. This wheel is constructed of a suitable hygroscopic or moisture absorbing material and is provided with perforations 22 for permitting flow of air through the wheel, the air passing through the wheel in the air conditioning chamber 10 giving up a large portion of its moisture to the wheel 22. As illustrated in Figure 2, the portion of the wheel through which the air in the chamber 10 passes is located above and to one side of the axis of rotation thereof so that the wheel will become unbalanced, as moisture is absorbed thereby, and since the wheel is freely rotatable, the unbalancing caused by the absorption of moisture in the upper portion of the wheel will cause its rotation.

The lower portion of the wheel 20 extends into a chamber 25 which forms a drying chamber for removing or driving off the moisture which has been absorbed by the wheel in the air conditioning chamber 10. A fan 26 driven by a motor 27 is provided for drawing air through the lower portion of the wheel extending into the chamber 25, there being a suitable heating coil 30 located ahead of the wheel 20 for heating the air prior to passing through the wheel so that evaporation of moisture from the wheel will take place.

The air conditioning chamber 10 may also include a cooling coil 31 for cooling the dehumidified air after it has passed through the wheel 22, since the absorption of moisture by the wheel will tend to raise the temperature of the air. A suitable cooling medium may flow through this coil 31 under the control of a valve 32 whose position may be controlled by the motor 33 having an operating arm 34 connected by means of the link 35 with the valve 32. The motor 33 may be a proportioning motor of the type illustrated by Patent 2,028,110 issued to D. G. Taylor on January 14, 1936. This motor may be controlled by a thermostat 36 responsive to the temperature of the space 15, this thermostat including a bimetallic element 37 which controls the position of a slider arm 38 with respect to the potentiometer resistance 39. As will be apparent upon a study of the aforementioned Taylor patent, the position of the arm 34 of the motor 33 will vary as the position of the arm 38 of thermostat 36 moves with respect to the potentiometer resistance 39 so that the position of the valve 32 will depend upon the temperature within the space 15. Power may be supplied to the motor 33 by means of conductors 40 and 41 connected to any suitable source of power, not shown.

The motor 14 for driving the fan 13 will normally be maintained in operation but this motor may be turned off whenever desired. The energization of the motor 14 is shown to be controlled by a relay generally designated by the reference character 45 and which relay includes a relay coil 46, an armature 47 and switch arms 48, 49 and 50 operatively connected to the armature 47. Fixed contacts 51, 52 and 53 cooperate with the arms 48, 49 and 50, respectively, and upon energization of the relay coil 46, arms 48 and 50 move into engagement with their respective contacts. Upon deenergization of the relay coil the arms move out of engagement with their respective contacts under the influence of gravity or any suitable biasing means, not shown. The arm 47 is arranged to move by the contact 52 and engage this contact only momentarily upon energization of the relay coil 46 for a purpose to be later explained. Power is supplied to the relay 45 by means of a step-down transformer 55 which includes a high tension primary 56 and a low tension secondary 57. The primary 56 is connected to line wires 59 and 60 which are in turn connected to a suitable source of power, not shown.

Switch members 61 and 62 are provided for the purpose of manually starting and stopping the fan motor 14. The switch member 61 includes a bridge member 63 adapted for engagement with contacts 64 and 65, this bridge member being biased to the position illustrated and being adapted to engage the fixed contacts when manually pushed into engagement therewith. The switch 62 includes a bridge member 67 which is adapted to bridge contacts 68 and 69 and is biased into engagement with these contacts so that it normally assumes the position illustrated. The bridge member 67 may, however, be manually moved out of engagement with the contacts 68 and 69. Upon closure of the switch 61 the relay 45 will be energized by means of the following circuit: from one side of the transformer secondary 57 through conductors 70, 71, switch 61, conductor 62, relay coil 46, and conductor 73 to the other side of the secondary 57. Upon energization of the relay, arm 50 moves into engagement with contact 53 as explained above, which closes a holding or maintaining circuit for the relay which includes the switch 62, this circuit being as follows: from one side of the secondary 57, through conductors 70, 75, switch 67, conductor 76, contact 53, switch arm 50, conductor 78, relay coil 46, and conductor 73 back to the other side of the secondary 57. It will now be apparent that upon momentary closure of the switch 61 the relay 45 will become energized and will remain energized as long as the switch 62 is closed, by reason of the holding circuit which is closed upon energization of the relay. Since the switch 61 is normally open, however, opening of the switch 62 will deenergize the relay 45. Movement of the arm 48 of the relay into engagement with contact 51 closes a circuit through the motor 14 as follows: from the line wire 60, through conductor 80, contact 51, switch arm 48, conductor 81, motor 14 and conductor 82 to the line wire 60. Accordingly the motor 14 is energized as long as the relay 45 is energized and fan 13 draws air through the air conditioning chamber 10 and forces it into the space 15.

The operation of motor 27 is under the control of a relay designated generally by the reference character 80. This relay is shown to comprise a relay coil 81, an armature 82, this armature controlling the position of a lever 83 carrying mercury switches 84 and 85. The lever 83 is biased by means of a spring 86 into engagement with the armature 82 and when the relay is energized and the armature 82 moved to the position illustrated the mercury switches assume the positions illustrated. The lower end of the armature 82 has connected thereto an inverted cup-shaped member 90 which may be of any suitable flexible material such as leather and is mounted for movement within a dash-pot 91 containing a suitable fluid 92. The member 90 has a small opening 93 which permits flow of the fluid 92 from the underside of the member 90 to the upper side of this member so that the member 90 will move downwardly within the dash-pot at a rate dependent upon the rate at which the fluid may flow through the port 93. When the relay 80 is energized, however, the armature will be drawn upwardly at a fast rate since there is very little resistance to upward movement of the piston 90 due to its configuration as will be apparent from the drawing. Accordingly, when the relay 80 is energized the armature is drawn upwardly at a fast rate to move the lever 83 carrying the switches 84 and 85 into the position illustrated. Upon deenergization of the relay 80, however, the armature will move downwardly at a relatively slow rate so that some time will elapse before the lever 83 will be tilted under the influence of the spring 86 in the opposite direction and thus causing movement of the mercury switches to their other positions.

The circuit to the motor 27 which controls the drying or reactivating fan 26 for the wheel 20 is controlled by the mercury switch 85. When the switch 85 is in the position illustrated due to the energization of the relay 80, current flows through the motor 27 as follows: from the line wire 60, through switch 85, conductor 95, motor 27 and conductor 96 to the line wire 59.

The energization of the relay 80 is controlled primarily by the switch 100, which switch includes a fixed contact member 101 and a movable contact member 102. The movable contact 102 is biased away from the member 101 and this movable contact carries an insulating member 103 for engagement with suitable bosses or switch actuating means 104 carried by the side of the wheel 20. The insulating member 103 may extend through an aperture 105 in one of the walls 106 enclosing that portion of the wheel 20 which is outside of the chambers 10 and 25. Upon rotation of the wheel 20 the bosses 104 carried by the wheel 20 will engage the member 103 of the switch 100 when these bosses or projections pass under the aperture 105, and at such times the movable contact 102 will be moved into engagement with the fixed contact 101. As soon as the boss or projection moves away from the aperture 105, however, the movable switch member 102 will move out of engagement with the contact 101 so that if the wheel is rotating at a fairly uniform rate, closure of the contacts 101 and 102 will take place periodically. Whenever the contacts 101 and 102 are in engagement with one another the relay coil 81 is energized as follows: from one side of the transformer secondary 57 through conductors 105, 106, the switch 100, conductors 107, 108, relay coil 81, and conductor 109 to the other side of the secondary 57. It will thus be apparent that whenever the wheel 20 moves into such a position that one of the projections 104 carried thereby moves the switch contact 102 into engagement with the cooperating contact 101, the relay 80 will be energized but will be again deenergized as far as this switch is concerned as soon as the wheel moves the projection away from the aperture 105. Upon energization of the relay, however, the lever 83 is moved into the position illustrated so that a circuit is established through the fan motor 27 as set forth above. The motor will continue to run until the circuit through the switch 85 is interrupted, but this will not happen until sufficient time has elapsed for the armature to move downwardly a sufficient distance so that the lever 83 will be tilted to its opposite position.

The relay 80 is also energized whenever the motor 14 driving the main ventilating fan 13 is started by the energization of the relay 45.

When this relay is energized the arm 47 thereof moves into engagement with the contact 52 momentarily as explained above, and engagement of this arm and the contact 52 closes a circuit through the relay coil 81 which is as follows: from one side of the transformer secondary 57, through conductors 105, 110, relay arm 49, contact 52, conductors 111, 108, relay coil 81 and conductor 109 to the other side of the secondary 57. It will thus be seen that every time the motor 14 is placed into operation the relay 80 will be energized thus causing operation of motor 27 at least for a predetermined length of time depending upon the rate of downward movement of the armature 82 as permitted by the dash-pot 91.

The heating coil 30 which heats the air prior to passing through the wheel 22 for driving moisture therefrom may be supplied with any suitable heating medium under the control of a valve 120 whose position may be controlled by a proportioning motor 121 similar to the motor 33 referred to above. This motor may be controlled by a controller responsive to the temperature of the air leaving the heating coil 30. For this purpose a bulb 125 is located downstream of the heating coil 30, this bulb being connected by means of a capillary tube 126 with a bellows 127 which controls the position of a slider arm 128 with respect to the potentiometer resistance 129. This tube, bulb and bellows may be provided with a suitable volatile fill whereby the bellows expands and contracts in response to changes in temperature of the air flowing over the bulb 125, a rise in temperature causing expansion of the bellows and movement of the arm 128 upwardly with respect to the resistance 129. The arm 128 may be biased into engagement with the bellows 127 by means of a spring 130. The lower extremity of the resistance 129 is connected with the lower terminal of the motor 121 by means of the conductor 131 and the upper extremity of the resistance 129 is connected by means of conductors 132 and 133 with the upper motor terminal. When the mercury switch 84 is in the position illustrated, in response to energization of the relay 80, the slider arm 128 is connected to the center terminal of the motor by means of conductor 135, the terminals in the right end of the mercury switch 84, and conductor 136. Accordingly, whenever the switch 84 is in the position illustrated the motor 121 will be operated directly in response to the temperature at the bulb 125 and as the temperature at this bulb increases the valve 120 will be moved by the motor 121 to its closed position and vice versa. As the armature 82 moves downwardly and the lever 83 is tilted in the opposite direction the terminals at the left end of the mercury switch 84 will be connected together and the circuit across the terminals at the opposite end of the switch will be interrupted so that the slider arm 128 will be disconnected from the proportioning motor 121. At this time, however, the center terminal of the motor will be connected to the upper terminal thereof by way of conductor 136, mercury switch 84 and conductors 140 and 133, thus effectively short-circuiting these two terminals whereupon the motor 121 will move the valve 120 to a minimum or closed position. At this time the valve will remain in this position regardless of the temperature of the air passing over the bulb 125. It will be apparent that the mercury switches 84 and 85 will be moved from one position to the other simultaneously so that as long as the motor 27 is in operation the heating coil 30 will be controlled by the temperature controller so as to control the temperature of the air passing through the wheel 20 for reactivation purposes.

In the operation of the system shown in Figure 1, as long as moisture is being absorbed by the wheel 20 in the chamber 10 there will be a tendency for the wheel to rotate since its upper portion will be heavier than the lower portion thereof. As the wheel rotates the switch 100 will be closed thereby at intervals, the frequency of which will of course be dependent upon the rate of rotation of the wheel 20 and each time the switch 100 is closed the relay 80 will be energized to cause operation of the fan motor 27 and to place the heating coil 30 in operation to maintain the temperature of the air passing through the lower portion of the wheel at the desired value. As the relay 80 is energized the piston member 82 will be carried by the armature upwardly towards the upper end of the dash-pot 91 which will permit the armature to move downwardly at a slow rate thus maintaining the motor 27 in operation for a predetermined length of time. If sufficient moisture is being absorbed from the air passing through the chamber 10 by the wheel 20 it will rotate at a sufficiently high rate of speed to energize the relay 81 at frequent enough intervals so that the lever 83 controlling the position of switches 84 and 85 will never be tilted in the other direction, thus keeping the fan motor 27 in continuous operation and maintaining the heating coil 30 in operation to control the temperature of the air passing through the wheel. Should the air passing through the chamber 10 be relatively dry, however, so that little or no moisture is absorbed therefrom by the wheel 20 it will eventually stop rotating or will rotate so slowly that continuous operation of the drying or reactivating means will be unnecessary. In this event relay 82 will not be energized often enough to maintain the armature in its upper position so that the fan 26 will stop operating and the valve controlling the supply of heating medium to the coil 30 will move to a minimum or closed position.

It may happen that after the system has been shut down for a long period of time such as may happen when the space is unoccupied and the source of power to the various devices has been cut off, that the wheel 20 will become saturated with moisture at all portions thereof so that when the system is started up no moisture will be absorbed by the wheel as it is already in a completely saturated condition, so that it will not rotate and cause the closure of the switch 100. Accordingly, whenever the motor 14 driving the main ventilating fan 13 is placed in operation the relay 45 upon being initially energized will energize the relay 80 thus placing the heating or reactivating means in operation for a predetermined length of time. This time will be sufficient to dry out the lower portion of the wheel, whereupon it will become unbalanced and will start rotating and the rotation of the wheel will then maintain the reactivating means in operation as heretofore described until it has been completely reactivated.

Referring now to Figure 3, the energizing circuit for the relay 80 including the switch 100 has been illustrated. In this form of the invention an additional energizing means for the relay 80 has been illustrated, this means comprising a continuously operating cam 150 for intermittently moving a contact 151 into engagement with a relatively fixed contact 152. The cam 150 may be operated by any suitable means such as a continuously operating motor 155. Upon closure of the switch members 151 and 152 the relay coil 81 is energized as follows: from the transformer secondary 57 through conductors 153, 154, switch members 151, 152, conductors 155, 156, relay coil 81 and conductor 157 to the other side of the secondary 57. This cam operated switch may be employed instead of the switch operated by the relay 45 in Figure 1 or if desired may be employed in addition to this switch for causing energization of the relay 80 and consequent operation of the reactivating means at regular definite intervals so as to avoid any possibility of the wheel permanently coming to rest because of saturation of all portions thereof during the operation of the system. This cam and switch operated thereby serve merely as a safety device to insure that the wheel will normally be kept rotating when reactivation is necessary and it will be understood that under normal conditions such a means will not be required. If desired, however, this means may be employed in addition to the switch which is closed whenever the main ventilating fan motor is placed in operation after a shut down of the system.

Having described a preferred form of my invention many modifications may become apparent to those skilled in the art. For example, any suitable means may be employed for delaying the return of the armature 82 of the relay 80 and the dash-pot arrangement described above is only one example of many possible arrangements. Moreover, any suitable means for controlling operation of the fan motor 14 may be employed and any suitable type of reactivating means for removing moisture from the wheel 20 may be utilized. It should therefore be understood that this invention is to be limited only by the scope of the appended claims.

I claim as my invention:

1. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, and means actuated by rotation of said wheel for causing operation of said moisture removing means.

2. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, means responsive to rotation of said wheel for causing operation of said moisture removing means, and means responsive to the starting of the air flow causing means for causing operation of said moisture removing means for a predetermined period.

3. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, means responsive to rotation of said wheel for causing operation of said moisture removing means, and means independent of the rotation of the wheel for causing operation of the moisture removing means at intervals for predetermined lengths of time.

4. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, said means including fan means for causing a flow of air through the lower portion of the wheel and heating means for heating the air prior to passing through said wheel, rotation of the wheel taking place as a result of the unbalancing of the wheel caused by the absorption of moisture in the upper portion thereof and the removal of moisture from the lower portion thereof, and means responsive to rotation of said wheel for rendering said fan means and heating means operative.

5. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, said means including fan means for causing a flow of air through the lower portion of the wheel and heating means for heating the air prior to passing through said wheel, rotation of the wheel taking place as a result of the unbalancing of the wheel caused by the absorption of moisture in the upper portion thereof and the removal of moisture from the lower portion thereof, means responsive to the temperature of the air leaving the heating means in control of the heating means, and means responsive to rotation of said wheel for causing operation of said fan and for placing the heating means under the control of the temperature responsive means.

6. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, said means including fan means for causing a flow of air through the lower portion of the wheel and heating means for heating the air prior to passing through said wheel, rotation of the wheel taking place as a result of the unbalancing of the wheel caused by the absorption of moisture in the upper portion thereof and the removal of moisture from the lower portion thereof, means responsive to the temperature of the air leaving the heating means in control of the heating means, means responsive to rotation of said wheel for causing operation of said fan for placing the heating means under the control of the temperature responsive means, and means responsive to the starting of the air flow causing means for placing the heating means under the control of the temperature responsive means and for causing operation of said fan for a predetermined period of time.

7. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, said means including fan means for causing a flow of air through the lower portion of the wheel and heating means for heating the air prior to passing through said wheel, rotation of the wheel taking place as a result of the unbalancing of the wheel caused by the absorption of moisture in the upper portion thereof and the removal of moisture from the lower portion thereof, means responsive to the temperature of the air leaving the heating means in control of the heating means, means responsive to rotation of said wheel for causing operation of said fan and for placing the heating means under the control of the temperature responsive means, and means independent of the rotation of the wheel for placing the heating means under the control of the temperature responsive means and for causing operation of said fan at intervals for predetermined lengths of time.

8. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, control means, means responsive to movement of said wheel into any one of a plurality of different positions for energizing said control means, the control means normally being deenergized upon movement of said wheel out of said positions, and means responsive to energization of said control means for causing operation of said moisture removing means for a predetermined period of time.

9. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, control means, means responsive to movement of said wheel into any one of a plurality of different positions for energizing said control means, the control means normally being deenergized upon movement of said wheel out of said positions, means responsive to energization of said control means for causing operation of said moisture removing means for a predetermined period of time and means responsive to the starting of the air flow causing means for causing momentary energization of said control means.

10. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, control means, means responsive to movement of said wheel into any one of a plurality of different positions for energizing said control means, the control means normally being deenergized upon movement of said wheel out of said positions, means responsive to energization of said control means for causing operation of said moisture removing means for a predetermined period of time and timing means for periodically causing a momentary energization of said control means.

11. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, relay means, said relay means including a movable armature and means responsive to movement of said armature in response to energization of said relay means for causing operation of said moisture removing means, means responsive to movement of said wheel to any one of a plurality of predetermined positions for causing energization of said relay means, said relay means normally being deenergized when said wheel moves away from any of said predetermined positions, and means for delaying movement of said armature to the position it assumes when the relay means is deenergized after deenergization of said relay means.

12. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, relay means, said relay means including a movable armature and means responsive to movement of said armature in response to energization of said relay means for causing operation of said moisture removing means, means responsive to movement of said wheel to any one of a plurality of predetermined positions for causing energization of said relay means, said relay means normally being deenergized when said wheel moves away from any of said predetermined positions, means for delaying movement of said armature to the position it assumes when the relay means is deenergized after deenergization of said relay means, and means responsive to the starting of the air flow causing means for momentarily causing energization of said relay means.

13. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, relay means, said relay means including a movable armature and means responsive to movement of said armature in response to energization of said relay means for causing operation of said moisture removing means, means responsive to movement of said wheel to any one of a plurality of predetermined positions for causing energization of said relay means, said relay means normally being deenergized when said wheel moves away from any of said predetermined positions, means for delaying movement of said armature to the position it assumes when the relay means is deenergized after deenergization of said relay means, and means independent of rotation of said wheel for causing momentary energization of said relay means.

14. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, a relay, an energizing circuit for said relay, a circuit controller for said energizing circuit located adjacent said wheel, a plurality of devices carried by said wheel for closing said circuit controller when any one of said devices is moved by said wheel to a predetermined position, means operated by the armature of said relay for causing operation of said moisture removing means when the armature is in the position it assumes when the relay is energized, and means for delaying movement of the armature away from said position after the relay has been deenergized.

15. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, a relay, an energizing circuit for said relay, a circuit controller for said energizing circuit located adjacent said wheel, a plurality of devices carried by said wheel for closing said circuit controller when any one of said devices is moved by said wheel to a predetermined position, means for controlling operation of the air flow causing means, a second energizing circuit for said relay, means operated in response to the operation of said controlling means for momentarily closing said second energizing circuit, means operated by the armature of said relay for causing operation of said moisture removing means when the armature is in the position it assumes when the relay is energized, and means for delaying movement of the armature away from said position after the relay has been deenergized.

16. In a dehumidifying system of the kind described, a vertically mounted freely rotatable perforated wheel formed of a moisture absorbing material, means for causing a flow of air to be dehumidified through the upper portion of said wheel, means for removing moisture from the lower portion of the wheel, rotation of the wheel taking place as a result of the unbalancing of the wheel caused by the existence of a greater amount of moisture in the upper portion of the wheel than in the lower portion thereof, a relay, an energizing circuit for said relay, a circuit controller for said energizing circuit located adjacent said wheel, a plurality of devices carried by said wheel for closing said circuit controller when any one of said devices is moved by said wheel to a predetermined position, a second energizing circuit for said relay, means for occasionally and momentarily closing said second energizing circuit, means operated by the armature of said relay for causing operation of said moisture removing means when the armature is in the position it assumes when the relay is energized, and means for delaying movement of the armature away from said position after the relay has been deenergized.

JAMES S. LOCKE.